United States Patent
Chen et al.

(10) Patent No.: US 11,606,977 B2
(45) Date of Patent: Mar. 21, 2023

(54) COMMUNICATION AND HEATING SYSTEM FOR ELECTRONIC NEBULIZER AND RELATED PRODUCTS

(71) Applicant: SHENZHEN TRANSPRING TECHNOLOGY CO., LTD., Guangdong (CN)

(72) Inventors: Chuhui Chen, Guangdong (CN); Yan Liu, Guangdong (CN)

(73) Assignee: Shenzhen Transpring Technology Co., Ltd., Guangdong (CN)

( * ) Notice: Subject to any disclaimer, the term of this patent is extended or adjusted under 35 U.S.C. 154(b) by 614 days.

(21) Appl. No.: 16/742,681

(22) Filed: Jan. 14, 2020

(65) Prior Publication Data

US 2021/0195954 A1  Jul. 1, 2021

Related U.S. Application Data

(63) Continuation of application No. PCT/CN2019/130949, filed on Dec. 31, 2019.

(51) Int. Cl.
*A24F 40/46* (2020.01)
*A24F 40/90* (2020.01)
*H02J 7/00* (2006.01)

(52) U.S. Cl.
CPC .............. *A24F 40/46* (2020.01); *A24F 40/90* (2020.01); *H02J 7/00043* (2020.01); *H02J 7/00045* (2020.01)

(58) Field of Classification Search
CPC ........ A24F 40/46; A24F 40/90; H02J 7/00043
See application file for complete search history.

(56) References Cited

U.S. PATENT DOCUMENTS

| | | | |
|---|---|---|---|
| 9,560,882 B2* | 2/2017 | Xiang | A24F 40/50 |
| 2006/0196518 A1* | 9/2006 | Hon | H02J 7/00 131/347 |
| 2014/0096782 A1* | 4/2014 | Ampolini | A24F 40/60 131/328 |
| 2017/0179737 A1 | 6/2017 | Emi et al. | |

(Continued)

FOREIGN PATENT DOCUMENTS

| | | |
|---|---|---|
| CN | 203446537 U | 2/2014 |
| CN | 106690422 A | 5/2017 |

(Continued)

*Primary Examiner* — Drew A Dunn
*Assistant Examiner* — Tarikh Kanem Rankine
(74) *Attorney, Agent, or Firm* — Dinsmore & Shohl LLP

(57) ABSTRACT

A communication and heating system for electronic nebulizer and related products are provided. The communication and heating system includes a battery circuit and a nebulizer circuit. The battery circuit is coupled with the nebulizer circuit through a first electrode and a second electrode which are movable. The battery circuit includes a first chip and a battery. The nebulizer circuit includes a second chip and a heating device. The first chip is configured to communicate with the second chip to perform identity authentication when the battery circuit is coupled with the nebulizer circuit. The first chip is configured to control the battery to supply power to the heating device when the identity authentication is successful. In this way, convenience of information exchange between the battery and the nebulizer can be improved.

15 Claims, 2 Drawing Sheets

(56) References Cited

U.S. PATENT DOCUMENTS

2018/0007554 A1     1/2018   Haley
2019/0272359 A1     9/2019   Popplewell et al.

FOREIGN PATENT DOCUMENTS

| CN | 107114825 | A | 9/2017 | | |
|----|-----------|---|--------|---|---|
| CN | 107156917 | A | 9/2017 | | |
| CN | 109757784 | A | 5/2019 | | |
| CN | 109936986 | A | 6/2019 | | |
| CN | 110150764 | A | 8/2019 | | |
| CN | 110226777 | A | 9/2019 | | |
| CN | 111083171 | A | 4/2020 | | |
| WO | WO-2015192357 | A1 * | 12/2015 | ........... | A24F 47/008 |
| WO | WO-2016145634 | A1 * | 9/2016 | ............. | A24F 47/00 |
| WO | 2017019428 | A1 | 2/2017 | | |

\* cited by examiner

COMMUNICATION AND HEATING SYSTEM FOR ELECTRONIC NEBULIZER AND RELATED PRODUCTS

CROSS-REFERENCE TO RELATED APPLICATION(S)

This application is a continuation of PCT Application No. PCT/CN 2019/130949, filed on Dec. 31, 2019, the disclosure of which is hereby incorporated by reference in its entirety.

TECHNICAL FIELD

The present disclosure relates to the technical field of communication circuits, and particularly to a communication and heating system for electronic nebulizer and related products.

BACKGROUND

Typically, when a battery supplies power to a nebulizer, a chip is deployed at battery side for power supply control. As usage requirements for the nebulizer increase, it is necessary to perform identification for the battery and the nebulizer to determine whether the battery would supply power to the nebulizer. At present, during the identification for the battery and the nebulizer, anti-counterfeiting code, built-in RFID tag, and other methods are usually used for information exchange. However, due to limitations such as sizes of the nebulizer and the battery, the information exchange in the above-mentioned ways is less convenient.

SUMMARY

According to a first aspect of the present disclosure, a communication system is provided. The system includes a battery circuit and a nebulizer circuit. The battery circuit is coupled with the nebulizer circuit through a first electrode and a second electrode which are movable.

The battery circuit includes a first chip and a battery. The nebulizer circuit includes a second chip and a heating device. The first chip is configured to communicate with the second chip to perform identity authentication when the battery circuit is coupled with the nebulizer circuit. The first chip is configured to control the battery to supply power to the heating device when the identity authentication is successful.

According to a second aspect of the present disclosure, a battery assembly is provided. The battery assembly includes a casing and a battery circuit. The battery circuit includes a first chip and a battery. The first chip is configured to perform identity authentication when the battery circuit is coupled with an external circuit. The first chip is configured to control the battery to supply power to the external circuit when the identity authentication is successful.

According to a third aspect of the present disclosure, a nebulizer is provided. The nebulizer includes a casing and a nebulizer circuit. The nebulizer circuit includes a second chip and a heating device. The second chip is configured to perform identity authentication when the nebulizer circuit is coupled with a battery circuit. The heating device is configured to receive power supply from the battery circuit when the identity authentication is successful.

These or other aspects of the present disclosure will be more apparent and easy to understand in the description of the following implementations.

BRIEF DESCRIPTION OF THE DRAWINGS

To describe the technical solutions in the implementations of the present disclosure more clearly, the following briefly introduces the accompanying drawings required for describing the embodiments. Apparently, the accompanying drawings in the following description illustrate some implementations of the present disclosure. Those of ordinary skill in the art may also obtain other drawings based on these accompanying drawings without creative efforts.

DETAILED DESCRIPTION OF ILLUSTRATED EMBODIMENTS

Figure 1:
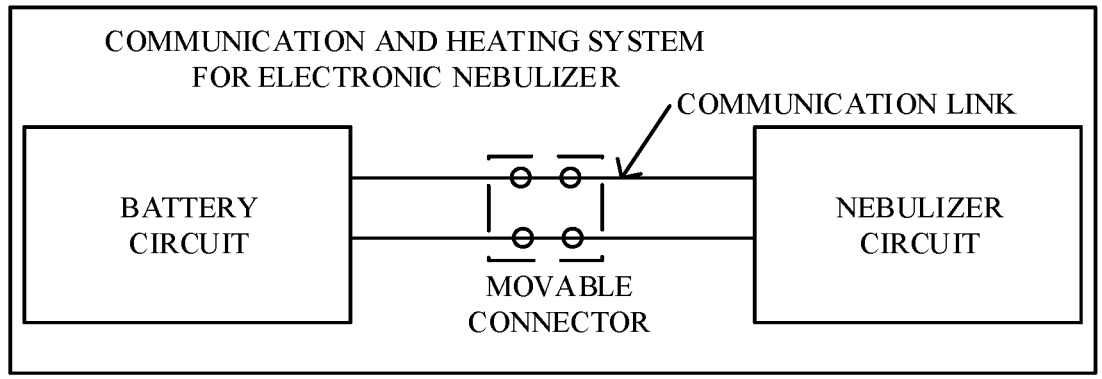
FIG. 1 is schematic diagram illustrating a communication and heating system for an electronic nebulizer according to implementations of the present disclosure.

Technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The following first introduces an implementation of information exchange between a battery circuit and a nebulizer circuit in a communication and heating system for an electronic nebulizer of implementations of the present disclosure.

In an existing solution, the battery circuit has a built-in chip which, during operation of the communication system consisting of the battery circuit and the nebulizer circuit, is used to control a battery in the battery circuit to supply power to the nebulizer circuit. Also, the nebulizer circuit has a corresponding chip that assists in controlling a heating device in the nebulizer circuit. However, a communication interface (that is, movable connector) used in the solution requires three or more ports in order to achieve power supply to the nebulizer and communication between chips (one communication link and two power supply links), resulting in an increased size of the connector required for coupling the battery circuit with the nebulizer circuit. Moreover, it may be incompatible with existing products.

As illustrated in FIG. 1, in a communication and heating system for an electronic nebulizer, a battery circuit is coupled with a nebulizer circuit through a movable connector. The battery circuit and the nebulizer circuit are configured to communicate with each other via a communication link. Information communicated may be information related to identity authentication, a random number encrypted, working information of a nebulizer in which the nebulizer circuit is provided, log information of a battery in which the battery circuit is provided, etc. For example, the information related to identity authentication may be identity information of the battery, identity information of the nebulizer, a manufacturer of the battery, a manufacturer of the nebulizer, and the like. For example, the working information of the nebulizer may be a working voltage required by the nebulizer, length of time required for power supply, displaying status of the battery when the nebulizer is working, an optimal working voltage or power information of a heating device in the nebulizer circuit, and the like. The displaying status may be a color displayed by a display light of the battery, a status indicated by display content in a display of the battery, and so on.

The battery circuit and the nebulizer circuit are coupled through a first electrode and a second electrode which are movable. The first electrode and the second electrode may be two electrodes of the movable connector. The movable connector may be threads, a snap joint, a 2 PIN connector, etc. The movable connector has only two electrodes, which may be the first electrode and the second electrode. The first electrode and the second electrode may be used as follows. The first electrode may be used for communication connection and power supply connection. The second electrode may be used for power supply connection. When the first electrode is used for communication connection and power supply connection, the first electrode is used as a positive pole and the second electrode is used as a common negative pole. The common negative pole may be understood as a negative pole for communication connection and a negative pole for power supply connection. The threads may be 510 threads.

When the battery circuit is in communication with the nebulizer circuit via a communication link (a link passing through the first electrode), information is communicated by means of tiny voltage fluctuations. The tiny voltage fluctuations may be understood as a small change in voltage.

FIG. 2 is schematic structural diagram illustrating a communication and heating system for an electronic nebulizer. The communication system includes a battery circuit and a nebulizer circuit. The battery circuit is coupled with the nebulizer circuit through a movable connector. The battery circuit includes a battery and a first chip. The nebulizer circuit includes a second chip and a heating device. The battery circuit further includes a switch K1, a resistor R1, and a resistor R2. The nebulizer circuit further includes a resistor R3 and a switch K2. The heating device may be a heating wire.

In the communication system, when the first chip is in communication with the second chip, the first chip turns on the switch K1 upon detecting that the battery circuit is on a preset state, such that the battery supplies power to the nebulizer circuit. The preset state may be that a user inhales using a device in which the battery circuit is provided, or a preset button on the device is touched, or the like. The device in which the battery circuit is provided may be an inhaler, an atomized inhaler, and a tobacco rod. The preset button may be a switch button.

When the nebulizer circuit receives a voltage provided by the battery circuit, the second chip obtains a starting voltage. After the starting voltage is obtained, the switch K2 is turned off (for example, if an initial state of the switch K2 is on, the switch K2 is turned off; while if the initial state of the switch K2 is off, No disconnection action is required), such that power supply to the heating device is stop. After the switch K2 is turned off, the first chip starts to communicate with the second chip in order for identity authentication.

Due to battery internal resistance, a battery voltage is higher when there is a current (or the current is higher), and the battery voltage is lower when there is no current (or the current is lower). Since the switch K2 is off, a current flowing through the heating device is cut off, which leads to a slight increase in voltage of a positive line. Upon detecting such a change (or the first chip performs no detection but delays for a preset time interval), the first chip outputs a high level via the third port to a first end of the resistor R1. This high level reaches the positive line through R1, and then the first chip controls the switch K1 to be turned off. In this case, the positive line still has enough voltage to power the second chip. The positive line may be understood as a wire connected to a positive electrode of the battery and a voltage-input port of the second chip (that is, the communication link). At this time, the first chip enters a data receiving state, waiting for data transmitted by the second chip.

When the switch K1 is turned off, connection between the positive line and the positive electrode of the battery is cut off. Voltage in the positive line is provided by the high level output by the first chip. A current flows through the resistor R1 and results in a voltage drop. Therefore, disconnection of the switch K1 leads to a slight decrease in the voltage of the positive line. Upon detecting the decrease in the voltage of the positive line (or the second chip performs no detection but delays for a preset time interval), the second chip outputs a low level to a second end of the resistor R3. At this time, R1 and R3 form a current loop, and the voltage of the positive line slightly decreases and is affected by the resistance ratio of R1 to R3. By setting the resistance ratio of R1 to R3, the voltage of the positive line may still be enough for power the second chip. The resistance ratio may be set according to the voltage divider rule.

A voltage signal in the positive line is transmitted to the first chip through R2. Upon detecting that the voltage of the positive line decreases, the first chip determines that a logic "0" is received (of course, such a decrease may be defined as a logic "1"). When the second chip outputs a high level (or stop outputting a low level) to the second end of R3 via the third port, the current flowing through R1 and R3 may be cue off, which leads to a slight increase in the voltage of the positive line. Similarly, the first chip may detect such change and determine that a logic "1" is received (of course, such an increase may be defined as a logic "0"). Whether the second chip outputs a low level to R3 (or output a high level)

may cause a voltage fluctuation in the positive line, thereby achieving data transmission from the second chip to the first chip.

Before the second chip transmits data to the first chip, the second chip sends to the first chip a random number that is used for data encryption. By means of data encryption, the security of communication can be improved.

After the second chip finishes transmitting data, the second chip outputs a high level (or stops outputting a low level) to the second end of the resistor R3, whereby the second chip enters a data receiving state.

After the first chip finishes receiving data, the first chip outputs a low level to the resistor R2 via the forth port. At this time, whether the first chip outputs a low level (or whether the first chip outputs a low level or a high level) to the resistor R2 may cause a voltage fluctuation in the positive line, whereby the first chip transmits data to the second chip.

When the first chip transmits data to the second chip, the first chip encrypts the data with the received random number.

When the second chip in the nebulizer circuit receives the data, the data is decrypted with the random number to obtain decrypted data. If the decrypted data is data for identity authentication, then the identity authentication may be performed on the device in which the battery circuit is provided. When the identity authentication is successful, the second chip in the nebulizer may encrypt and send back data for identity confirmation.

During the identity authentication with the decrypted data, the identity authentication may be performed by means of information comparison, or the identity authentication may be performed by means of similarity matching, etc.

Upon receiving the data for identity confirmation, the first chip controls the battery to supply power to the nebulizer circuit. When the first chip controls the battery to supply power to the nebulizer circuit, the first chip turns on the switch K1, and the third port stops outputting a high level for supplying power to the second chip. The second chip turns on the switch K2 so as to power the heating device.

In implementations of the present disclosure, communication between the first chip and the second chip can be achieved by two ports of the movable connectors. In the meantime, the battery circuit can supply power to the nebulizer circuit. That is, high power supply to the heating device and communication between chips can be achieved. The two electrodes used is compatible with existing products, and the size of the connectors can be reduced, thereby reducing implementation costs.

After finishing identity authentication between the first chip and the second chip, the second chip may send data to the first chip. The data may be one or more of the following data:

1. The number of mouthfuls and total duration of the nebulizer, that is, capacity of the nebulizer and how long can a user inhale with the nebulizer. This function aims to restrict the nebulizer from being refiled with oil, therefore excluding other different kinds of oil.

2. A dosage for a day. For example, a patient should inhale three times a day, one in the morning, one at noon, one in the evening, and inhale a mouthful for each time. If the patient forgets to inhale, the nebulizer may remind the patient by a built-in vibrator, a clock, a buzzer, etc.

3. A time and duration of each inhalation, which can be recorded and form a weekly report or a monthly report as a usage log.

4. Power, voltage, temperature, etc. of the nebulizer.

After receiving the data, the first chip sends corresponding working parameters to the second chip. Upon receiving the feedback from the first chip, the second chip determines whether to execute the corresponding working parameters. If the second chip has preset working parameters (built-in working parameters, etc.), the working parameters sent by the first chip can be ignored and the preset working parameters can be used instead. However, if the working parameters sent by the first chip are mandatory parameters, the second chip executes the mandatory parameters. The second chip may reply feedback information which indicates whether the working parameters sent by the first chip are used. Upon receiving the feedback information from the second chip, the first chip may display status such as working status of the second chip.

The second chip may also control an input voltage of the heating device in such a manner that the input voltage remains in a stable state. The stable state can be understood as that a voltage fluctuation is within the preset range. The preset range may be a relatively small range, which may be set by experience or historical data. Therefore, stability of the nebulizer circuit can be improved.

The battery circuit may further include a clock circuit. The second chip may receive information (e.g. time, etc.) from the first chip so as to store log information of the nebulizer. The log information includes at least one of: usage time of the nebulizer circuit, a usage state of the nebulizer circuit, and a number of usage times of the nebulizer circuit. With storage of the log information, logs may be checked subsequently, which improves its practicability.

The nebulizer circuit may further include a protection circuit. The protection circuit may inform the second chip to turn off the switch K2 when a current flowing through the heating device is higher than a preset current. The protection circuit may include a current detecting device configured to detect the current flowing through the heating device. By providing the protection circuit, when the current flowing through the heating device is higher than the preset current, the switch K2 may be turned off, which can improve the safety and stability of the communication system.

The second chip may be configured to obtain ambient temperature and control an output power of the heating device according to the ambient temperature. When the ambient temperature is higher, the output power of the heating device is reduced, and when the ambient temperature is lower, the output power of the heating device is increased. By adjusting the output power of the heating device according to the ambient temperature, the output power of the heating device can be adjusted dynamically, so as to reduce energy consumption.

The second chip may obtain the ambient temperature by a temperature sensor. If the temperature sensor is integrated in the second chip, the second chip does not need to obtain the ambient temperature through an external sensor, but directly obtains the ambient temperature through the integrated temperature sensor.

The nebulizer circuit may be coupled with other reading devices through a movable connector. In this way, when a reading device needs to read the log informations, the nebulizer circuit may provide the log information of the nebulizer to the reading device. Also, the nebulizer may include a wireless transmitting apparatus through which the log information may be sent to the reading device. In comparison with manual recording, reading the log information through the moveable connector or the wireless transmitting apparatus may improve the practicability of the nebulizer circuit.

Figure 3:
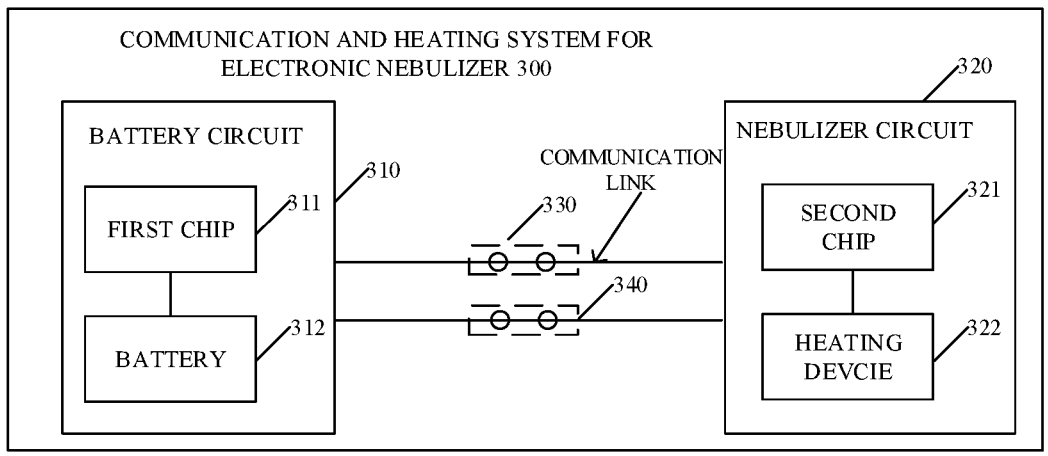
FIG. 3 is schematic structural diagram illustrating a communication and heating system for an electronic nebulizer according to implementations of the present disclosure.

FIG. 3 is schematic structural diagram illustrating a communication and heating system for an electronic nebulizer according to implementations of the present disclosure. As illustrated in FIG. 3, the communication system 300 includes a battery circuit 310 and a nebulizer circuit 320. The battery circuit 310 is coupled with the nebulizer circuit 320 through a first electrode 330 and a second electrode 340 which are movable.

The battery circuit 310 includes a first chip 311 and a battery 312. The nebulizer circuit 320 includes a second chip 321 and a heating device 322. The first chip 311 is configured to communicate with the second chip 321 to perform identity authentication when the battery circuit 310 is coupled with the nebulizer circuit 320. The first chip 311 is configured to control the battery 312 to supply power to the heating device 322 when the identity authentication is successful.

Figure 4:
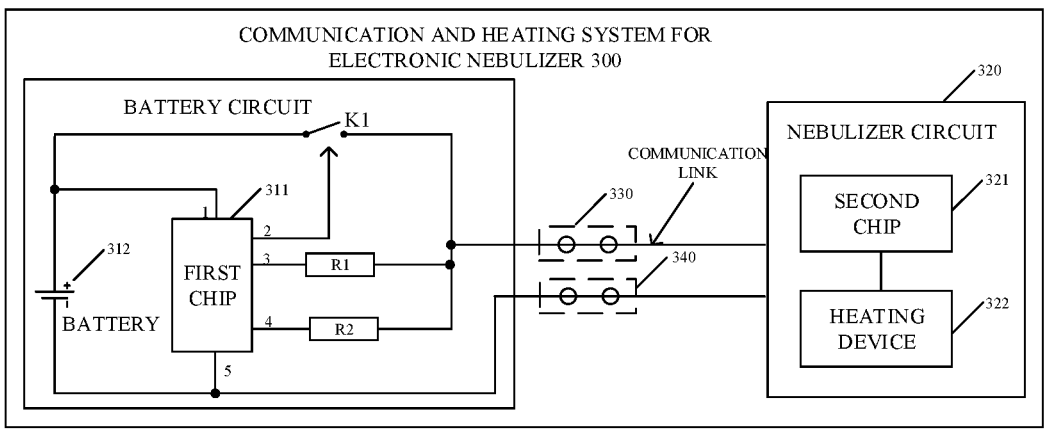
FIG. 4 is schematic structural diagram illustrating a communication and heating system for an electronic nebulizer according to implementations of the present disclosure.

In at least one implementations, as illustrated in FIG. 4, the battery circuit 310 further includes a switch K1, a resistor R1, and a resistor R2.

The first chip 311 has a first port coupled with a positive electrode of the battery 312 and a first end of the switch K1. The first chip 311 has a second port coupled with a control end of the switch K1. The first chip 311 has a third port coupled with a first end of the resistor R1. The first chip 311 has a fourth port coupled with a first end of the resistor R2. The first chip 311 has a fifth port coupled with a negative electrode of the battery and a first port of the second electrode 340. The switch K1 has a second end coupled with a first port of the first electrode 330, a second end of the resistor R1, and a second end of the resistor R2.

Figure 5:
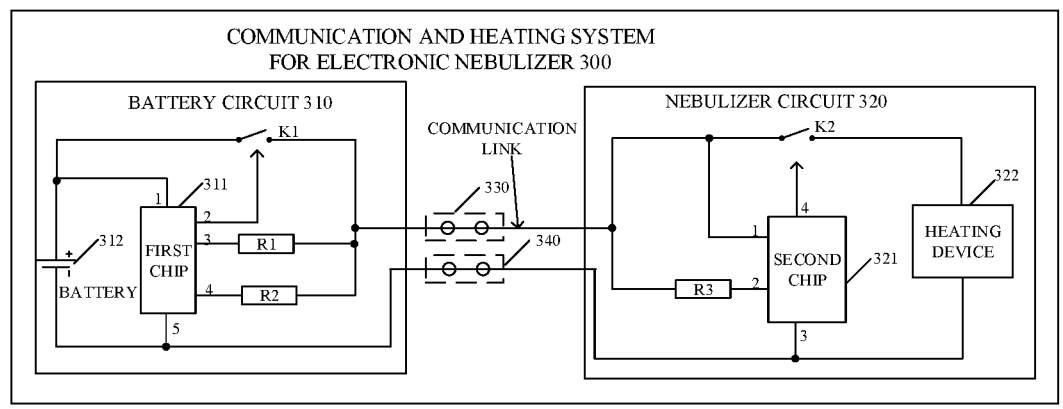
FIG. 5 is schematic structural diagram illustrating a communication and heating system for an electronic nebulizer according to implementations of the present disclosure.

In at least one implementations, as illustrated in FIG. 5, the nebulizer circuit 320 further includes a switch K2 and a resistor R3.

The first electrode 330 has a second port coupled with a first end of the switch K2, a first end of the resistor R3, and a first port of the second chip 321. The second electrode 340 has a second port coupled with a third port of the second chip 321 and a second end of the heating device 322. The resistor R3 has a second end coupled with a second port of the second chip 321. The switch K2 has a second end coupled with a first end of the heating device 322. The switch K2 has a control end coupled with a fourth end of the second chip 321.

In at least one implementations, the switch K1 and the switch K2 are configured to be turned off and the first chip is configured to supply power to the second chip via the third port when the first chip and the second chip perform the identity authentication.

In at least one implementations, the second chip is further configured to control an input voltage of the heating device in such a manner that the input voltage remains stable.

In at least one implementations, the second chip is further configured to store log information of the nebulizer circuit. The log information includes at least one of: usage time of the nebulizer circuit, a usage state of the nebulizer circuit, and a number of usage times of the nebulizer circuit.

In at least one implementations, the second chip is further configured to store identity information of a nebulizer in which the nebulizer circuit is provided, capacity information of the nebulizer, total usage duration of the nebulizer, optimal working voltage and power information of the heating device in the nebulizer circuit.

In at least one implementations, the nebulizer circuit further includes a protection circuit configured to inform the second chip to turn off the switch K2 upon detecting that a current flowing through the heating device is higher than a preset current.

In at least one implementations, the second chip is further configured to obtain an ambient temperature and control an output power of the heating device according to the ambient temperature.

Figure 2:
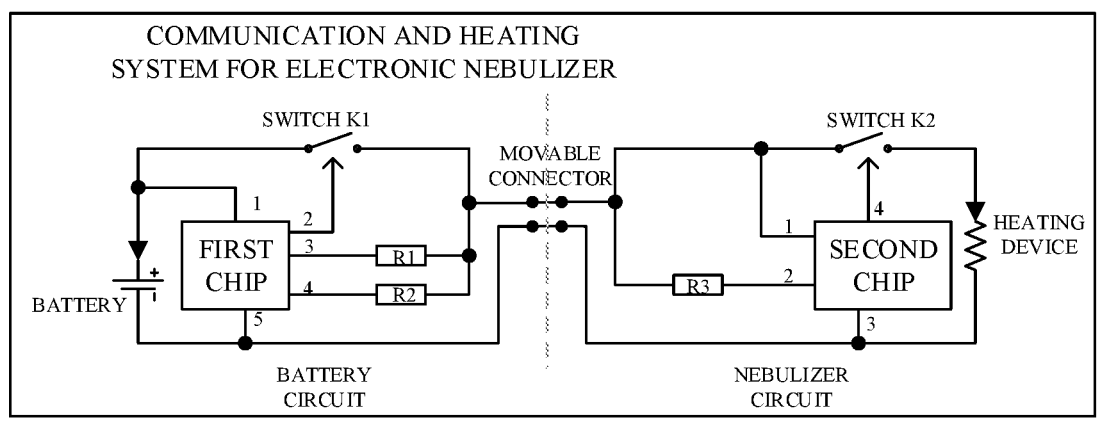
FIG. 2 is schematic structural diagram illustrating a communication and heating system for an electronic nebulizer according to implementations of the present disclosure.

For the sake of simplicity, definitions of the battery circuit, the nebulizer circuit, and the like are not described herein, and for details, reference may be made to FIG. 2 and the relevant description. Also, the process of communication between the first chip in the battery circuit and the second chip in the nebulizer circuit is not described herein, and reference may be made to FIG. 1, FIG. 2, and the relevant description. For other terms and related interpretation, reference may be made to implementations above-described.

Implementations of the present disclosure provide a battery assembly. The battery assembly includes a casing and a battery circuit. The battery circuit includes a first chip and a battery. The first chip is configured to perform identity authentication when the battery circuit is coupled with an external circuit. The first chip is configured to control the battery to supply power to the external circuit when the identity authentication is successful.

In at least one implementations, the external circuit may be a nebulizer circuit. The nebulizer circuit may include a second chip and a heating device. The first chip may be configured to communicate with the second chip to perform identity authentication when the battery circuit is coupled with the nebulizer circuit.

In at least one implementations, the battery circuit further includes a switch K1, a resistor R1, and a resistor R2. The first chip has a first port coupled with a positive electrode of the battery and a first end of the switch K1. The first chip has a second port coupled with a control end of the switch K1. The first chip has a third port coupled with a first end of the resistor R1. The first chip has a fourth port coupled with a first end of the resistor R2. The first chip has a fifth port coupled with a negative electrode of the battery and a first port of a second electrode. The switch K1 has a second end coupled with a first port of a first electrode, a second end of the resistor R1, and a second end of the resistor R2.

In at least one implementations, the switch K1 is configured to be turned off and the first chip is configured to supply power to the external circuit via the third port when the first chip performs the identity authentication with the external circuit.

Implementations of the present disclosure provide a nebulizer. The nebulizer includes a casing and a nebulizer circuit. The nebulizer circuit includes a second chip and a heating device. The second chip is configured to perform identity authentication when the nebulizer circuit is coupled with a battery circuit. The heating device is configured to receive power supply from the battery circuit when the identity authentication is successful.

In at least one implementations, the battery circuit may include a first chip and a battery. The second chip may be configured to communicate with the first chip to perform identity authentication when the nebulizer circuit is coupled with the battery circuit.

In at least one implementations, the nebulizer circuit further includes a switch K2 and a resistor R3. The second chip has a first port coupled with a second port of a first electrode, a first end of the switch K2, and a first end of the resistor R3. The second chip has a second port coupled with a second end of the resistor R3. The second chip has a third port coupled with a second port of a second electrode and a second end of the heating device. The switch K2 has a second end coupled with a first end of the heating device. The switch K2 has a control end coupled with a fourth end of the second chip.

In at least one implementations, the switch K2 is configured to be turned off when the second chip performs the identity authentication with the battery circuit.

In at least one implementations, the second chip is further configured to control an input voltage of the heating device in such a manner that the input voltage remains stable.

In at least one implementations, the second chip is further configured to store log information of the nebulizer circuit, the log information comprising at least one of: usage time of the nebulizer circuit, a usage state of the nebulizer circuit, and a number of usage times of the nebulizer circuit.

In at least one implementations, the nebulizer circuit further includes a protection circuit configured to inform the second chip to turn off the switch K2 upon detecting that a current flowing through the heating device is higher than a preset current.

In at least one implementations, the second chip is further configured to obtain an ambient temperature and control an output power of the heating device according to the ambient temperature.

It is to be noted that, for the sake of simplicity, the foregoing method implementations are described as a series of action combinations. However, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware. The program may be stored in a computer readable memory, which may include a flash memory, a ROM, a RAM, Disk or CD, and so on.

The implementations of the present application have been described in detail above. Specific examples are used herein to explain the principles and implementation of the present disclosure. The descriptions of the above implementations are only used to help understand the method and core ideas of the present disclosure. Persons of ordinary skill in the art may change the specific implementation and application scope according to the idea of the present application. In summary, the content of this description should not be construed as a limitation on the present disclosure.

What is claimed is:

1. A communication and heating system for an electronic nebulizer, the system comprising a battery circuit and a nebulizer circuit, the battery circuit being coupled with the nebulizer circuit through a first electrode and a second electrode which are movable;
   the battery circuit comprising a first chip and a battery;
   the nebulizer circuit comprising a second chip and a heating device;
   the first chip being configured to communicate with the second chip to perform identity authentication when the battery circuit is coupled with the nebulizer circuit; and
   the first chip being configured to control the battery to supply power to the heating device when the identity authentication is successful, wherein
   the battery circuit further comprises a switch K1, a resistor R1, and a resistor R2, wherein
      the first chip has a first port coupled with a positive electrode of the battery and a first end of the switch K1;
      the first chip has a second port coupled with a control end of the switch K1;
      the first chip has a third port coupled with a first end of the resistor R1;
      the first chip has a fourth port coupled with a first end of the resistor R2;
      the first chip has a fifth port coupled with a negative electrode of the battery and a first port of the second electrode; and
      the switch K1 has a second end coupled with a first port of the first electrode, a second end of the resistor R1, and a second end of the resistor R2.

2. The communication and heating system of claim 1, wherein the nebulizer circuit further comprises a switch K2 and a resistor R3, wherein
the second chip has a first port coupled with a second port of the first electrode, a first end of the switch K2, and a first end of the resistor R3;
the second chip has a second port coupled with a second end of the resistor R3;
the second chip has a third port coupled with a second port of the second electrode and a second end of the heating device;
the switch K2 has a second end coupled with a first end of the heating device; and
the switch K2 has a control end coupled with a fourth end of the second chip.

3. The communication and heating system of claim 2, wherein
the switch K1 and the switch K2 are configured to be turned off and the first chip is configured to supply power to the second chip via the third port when the first chip and the second chip perform the identity authentication.

4. The communication and heating system of claim 1, wherein the second chip is further configured to control an input voltage of the heating device in such a manner that the input voltage remains stable.

5. The communication and heating system of claim 1, wherein the second chip is further configured to store log information of the nebulizer circuit, the log information comprising at least one of:
usage time of the nebulizer circuit, a usage state of the nebulizer circuit, and a number of usage times of the nebulizer circuit.

6. The communication and heating system of claim 1, wherein the nebulizer circuit further comprises a protection circuit configured to inform the second chip to turn off the switch K2 upon detecting that a current flowing through the heating device is higher than a preset current.

7. The communication and heating system of claim 1, wherein the second chip is further configured to obtain an ambient temperature and control an output power of the heating device according to the ambient temperature.

8. A battery assembly, comprising
a casing; and
a battery circuit comprising a first chip and a battery, wherein
the first chip is configured to perform identity authentication when the battery circuit is coupled with an external circuit; and
the first chip is configured to control the battery to supply power to the external circuit when the identity authentication is successful, wherein
the battery circuit further comprises a switch K1, a resistor R1, and a resistor R2, wherein
the first chip has a first port coupled with a positive electrode of the battery and a first end of the switch K1;
the first chip has a second port coupled with a control end of the switch K1;
the first chip has a third port coupled with a first end of the resistor R1;
the first chip has a fourth port coupled with a first end of the resistor R2;
the first chip has a fifth port coupled with a negative electrode of the battery and a first port of the second electrode; and
the switch K1 has a second end coupled with a first port of the first electrode, a second end of the resistor R1, and a second end of the resistor R2.

9. The battery assembly of claim 8, wherein
the switch K1 is configured to be turned off and the first chip is configured to supply power to the external circuit via the third port when the first chip performs the identity authentication with the external circuit.

10. A nebulizer, comprising
a casing; and
a nebulizer circuit comprising a second chip and a heating device, wherein
the second chip is configured to perform identity authentication when the nebulizer circuit is coupled with a battery circuit;
the heating device is configured to receive power supply from the battery circuit when the identity authentication is successful, wherein
the nebulizer circuit further comprises a switch K2 and a resistor R3, wherein
the second chip has a first port coupled with a second port of a first electrode, a first end of the switch K2, and a first end of the resistor R3;
the second chip has a second port coupled with a second end of the resistor R3;
the second chip has a third port coupled with a second port of a second electrode and a second end of the heating device;
the switch K2 has a second end coupled with a first end of the heating device; and
the switch K2 has a control end coupled with a fourth end of the second chip.

11. The nebulizer of claim 10, wherein the switch K2 is configured to be turned off when the second chip performs the identity authentication with the battery circuit.

12. The nebulizer of claim 10, wherein the second chip is further configured to control an input voltage of the heating device in such a manner that the input voltage remains stable.

13. The nebulizer of claim 10, wherein the second chip is further configured to store log information of the nebulizer circuit, the log information comprising at least one of:
usage time of the nebulizer circuit, a usage state of the nebulizer circuit, and a number of usage times of the nebulizer circuit.

14. The nebulizer of claim 10, wherein the nebulizer circuit further comprises a protection circuit configured to inform the second chip to turn off the switch K2 upon detecting that a current flowing through the heating device is higher than a preset current.

15. The nebulizer of claim 10, wherein the second chip is further configured to obtain an ambient temperature and control an output power of the heating device according to the ambient temperature.

\* \* \* \* \*